Nov. 6, 1951 A. B. OGDEN 2,573,926
DIRECTION INDICATING LIGHT
Filed May 4, 1950 2 SHEETS—SHEET 1
Fig. 1
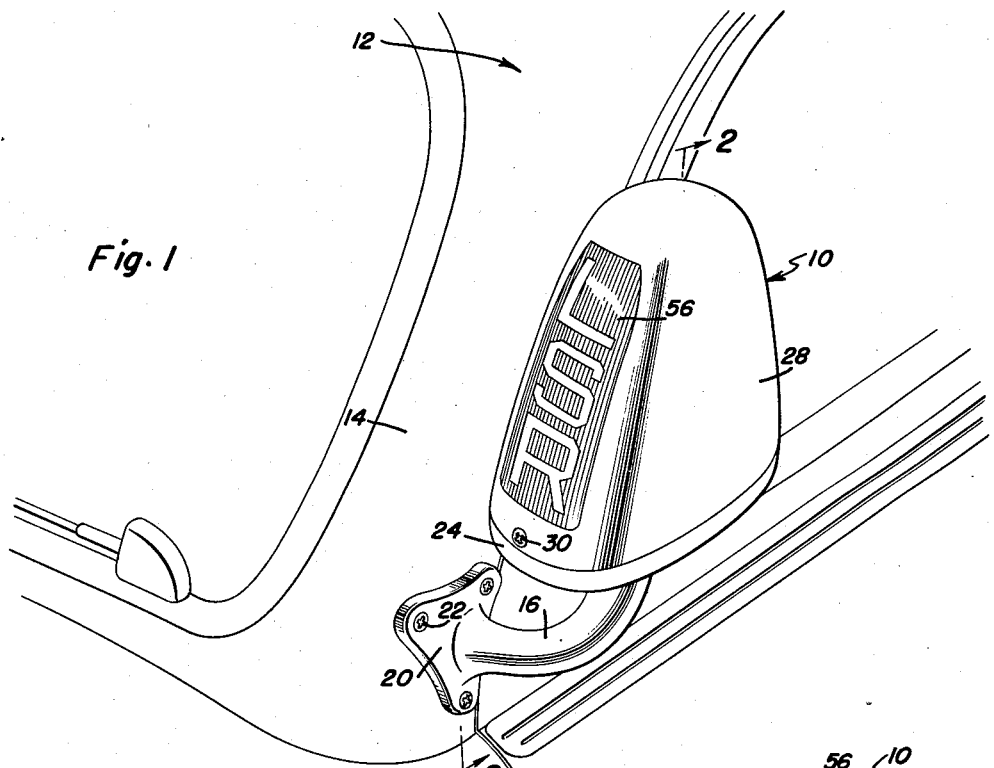
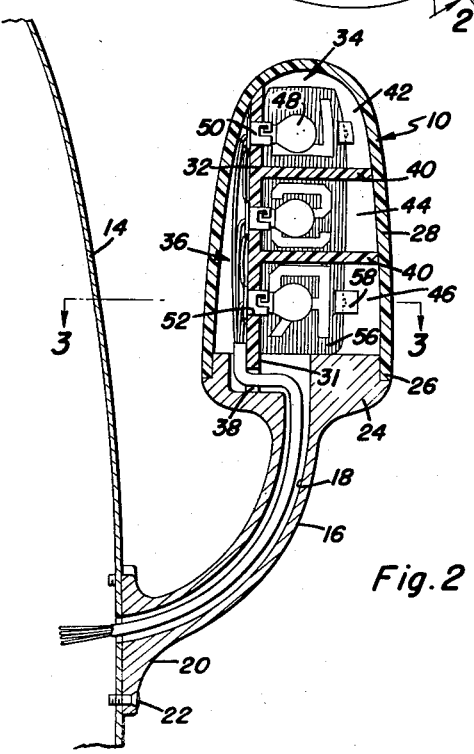
Fig. 2
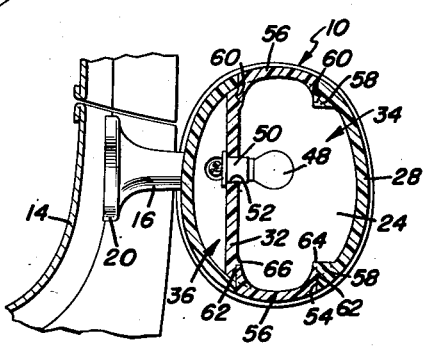
Fig. 3
Arnold B. Ogden
INVENTOR.
BY *Clarence A. O'Brien*
*and Harvey B. Jacobson*
Attorneys Nov. 6, 1951  A. B. OGDEN  2,573,926
DIRECTION INDICATING LIGHT
Filed May 4, 1950  2 SHEETS—SHEET 2
Fig. 4
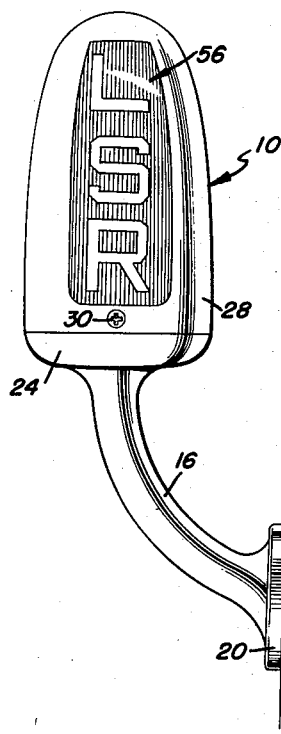
Fig. 5
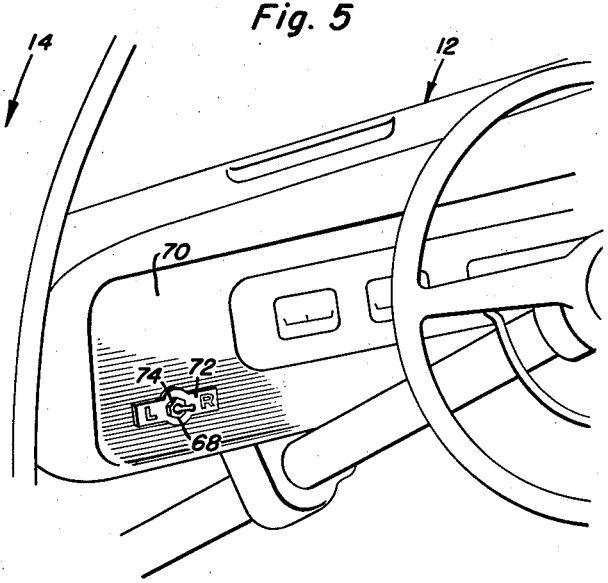
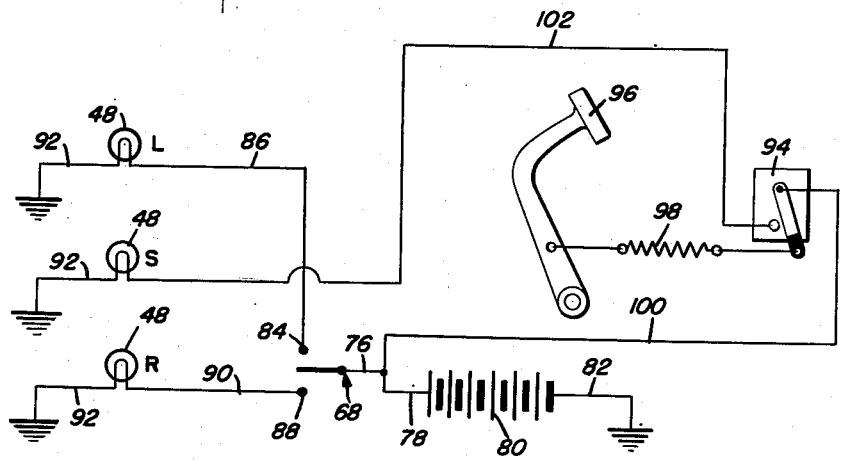
Fig. 6
Arnold B. Ogden
INVENTOR.
BY Clarence A. O'Brien
and Harvey B. Jacobson
Attorneys Patented Nov. 6, 1951

2,573,926

UNITED STATES PATENT OFFICE 2,573,926

DIRECTION INDICATING LIGHT

Arnold B. Ogden, Jefferson City, Mo., assignor of one-third to Mary Elyda Luse and one-third to Bessie L. Ogden, both of Jefferson City, Mo.

Application May 4, 1950, Serial No. 160,009

5 Claims. (Cl. 177—329)

This invention comprises novel and useful improvements in traffic signal directors, and more particularly pertains to a signal director which will indicate to approaching and following motorists when the driver is going to stop and/or the direction in which he will turn.

An important object of this invention is to provide a traffic signal director such that a single unit will indicate to both approaching and following motorists when the driver is going to stop, or turn, and the direction in which he will turn.

Another object of this invention is to provide a traffic signal director in accordance with the foregoing object, which director is adapted to be mounted on the side of a vehicle in such a manner as to not obstruct the vision of the driver either forwardly or to the side, yet which is at all times clearly visible to both approaching and following motorists.

A further object of this invention is to provide a signal director which is of simple construction, and which is readily adaptable to inexpensive manufacture; which has an efficacious appearance, and which is highly efficient for the purposes intended.

An important feature of this invention resides in the provision of a traffic signal director which is adapted to be mounted on the side of a vehicle, which signal director has indicating panes on the forward and rear surfaces thereof so that a single set of lamps may be utilized to indicate to both approaching and following motorists when the driver is going to stop, or turn, and the direction in which he will turn.

Another feature of this invention resides in the provision of a signal director having a casing constructed in accordance with the foregoing feature, with a vertically extending divider wall in the casing, which wall separates the casing into an illuminating compartment and a conductor receiving compartment, which divider wall supports the illuminating means, and also supports a plurality of partition walls which provide a plurality of individual chambers in the illuminating compartment.

These, together with various ancillary objects and features, are attained by this device, a preferred emebodiment of which has been illustrated by way of example only in the accompanying drawings, wherein:

Figure 1 is a perspective elevational view of the traffic signal director shown attached to the windshield post of a vehicle;

Figure 2 is a vertical sectional view taken substantially on the plane 2—2 of Figure 1, looking rearwardly to show the indicating pane on the rear side of the traffic signal director;

Figure 3 is a horizontal sectionalized view of the signal director, taken substantially on the plane 3—3 of Figure 2, also shown attached to a vehicle;

Figure 4 is a rear elevational view of the traffic signal director shown attached to the windshield post of a vehicle;

Figure 5 is a perspective elevational view of the signal director control switch shown mounted upon the dashboard of a vehicle; and Figure 6 is a schematic wiring diagram showing the manner in which the illuminating lamps are connected by means of switches to a source of power.

It is a primary desideratum of this invention to reduce the manufacture and installation expense which is necessarily incident to the construction and use of individual signal directors on the forward and rear portions of a vehicle, and yet to retain the safety and operational advantages of such signal directors. For this purpose, there has been evolved the unitary signal director which is so constructed and designed that it will serve to indicate to both approaching and following motorists those signals which the driver desires to convey.

Referring now more specifically to the accompanying drawings, wherein like numerals designate similar parts throughout the various views, it will be seen that there is provided a traffic signal director indicated generally by the numeral 10 which is adapted to be mounted upon a vehicle 12, as on the forward windshield post 14, specifically on the left-hand side of the vehicle, so as to be in clear view of either the approaching vehicle or the vehicles which are following. It is to be understood, however, that the signal director 10 may be mounted in other positions on the vehicle without departing from the scope of this invention, as long as it is in clear view from the forward and rear ends of the vehicle.

A suitable support arm 16, having a bore 18 therein, is secured as by the mounting flange 20 to the exterior of the windshield post 14 of the vehicle, suitable fasteners 22 being provided for this purpose. It is intended that the arm 16 have an arcuate contour, as shown, so that the platform 24, which is formed on the other end thereof, will lie in a substantially horizontal plane. The platform 24 is preferably provided with a peripheral recess 26, which recess receives the lower end portion of a substantially paraboloidally shaped casing 28, which casing is secured to the platform 24, as by fasteners 30. It will thus be seen that there is provided a signal director which has an efficacious appearance, and which is particularly adapted to be mounted on the windshield post of a vehicle, in a manner so as not to obstruct the vision either forwardly or to the side of the vehicle.

The platform 24 is also provided with a groove 31 which extends substantially parallel to the inner surface of the mounting flange 20, which groove detachably receives a vertically disposed dividing wall 32. As is more readily apparent from a consideration of Figure 2 of the drawings, the divider wall 32 is so mounted upon the platform 24 that it lies in a plane which is laterally displaced from the center of the signal director, the displacement being in a direction toward the side of the vehicle 12. This divider wall thus forms within the casing an illuminating compartment indicated generally by the numeral 34, and a conductor receiving compartment indicated generally by the numeral 36. A suitable passageway 38 is formed in the material of the platform 24 and communicates the bore 18 with the conductor compartment 36 for reasons which will become apparent as the following description proceeds.

Secured to the divider wall 32 are a plurality of partition walls 40, which walls divide the illuminating compartment 34 into a plurality of chambers. Although it is to be understood that any number of chambers may be provided, it has been found sufficient to divide the compartment 34 into upper, intermediate and lower chambers 42, 44 and 46, respectively. Each of the chambers is communicated, as by a bore 52, with the conductor receiving compartment, and illuminating lamps 48 having flanged sockets 50 extend through the bores 52.

The forward and rear walls of the casing 28 are suitably apertured, as at 54, so as to detachably receive the forward and rear indicating panes 56.

It is intended that the divider wall 32 be aligned with one side of the apertures 54 in the forward and rear walls of the casing, suitable recesses 60 being formed in the divider wall adjacent the apertures for reasons which will become apparent as the following description proceeds. Lugs 58 are formed on the interior of the casing adjacent the other side of the apertures 54, suitable recesses 60 also being formed in the faces of the lugs which register with the dividing wall. Forward and rear indicating panes 56, which may be of identical construction, are formed complementary to the apertures 54, and are provided with oppositely extending detents 62 on the outer edges thereof, which detents are detachably received in the recesses 60. Further, stop flanges 64 and 66 may be provided on the lugs 58 and divider wall 32, respectively, to prevent the indicating panes from being pressed inwardly.

The indicating panes are intended to be formed of a translucent material, upon which may be formed or imprinted suitable indicia letters 66. The indicia letters 66, such as "L" which signifies "Left," "S" which signifies "Stop" and "R," which signifies "Right," may be imprinted upon that part of the indicia indicating panes 56 which respectively lie adjacent the chambers 42, 44 and 46. It is also believed evident that other indicia numerals may be imprinted upon the indicating panes without departing from the spirit of this invention and that, further, the indicating panes may be formed with different colored portions which lie adjacent the different chambers, such as "Red" for that portion which lies adjacent the stop chamber 44, "Amber" for that portion which lies adjacent the left chamber 42, and "Green" for that portion which lies adjacent the right chamber 46.

In order to selectively actuate the lamps in the left and right chambers 42 and 46, respectively, there is provided a two-way switch 68, preferably of the single-pole, double-throw type, which is adapted to be mounted on the interior of the vehicle 12, at any position conveniently accessible to the driver, such as on the dashboard 70. A suitable indicia carrying plate 72, having the letters "L" and "R" imprinted thereon to signify the direction of turn, is secured to the switch and to the dashboard as by the nut 74.

The common or center terminal of the two-way switch 68 is electrically connected as by conductors 76 and 78 to a suitable source of power 80, which source of power is otherwise electrically grounded, as by conductor 82. The "Left" terminal of the two-way switch is electrically connected, as by a conductor 86, to the lamp 48 in the "Left" chamber 42, the "Right" terminal of the two-way switch being connected, as by a conductor 90, to the lamp in the "Right" chamber 46, each of the lamps being otherwise electrically grounded as by conductors 92. It will thus be seen that when the switch 68 is moved so as to establish electrical contact with the "Left" terminal 84 that the lamp in the upper chamber 42 will be illuminated, and when the switch 68 is moved so as to electrically contact the "Right" terminal 88, the lamp in the lower or "Right" chamber 46 will be illuminated.

It is intended that the lamp 48 in the "Stop" chamber 44 be actuated independently of the lamps in the "Left" or "Right" chambers, and for this purpose there is provided a switch 94 which is adapted to be mounted upon the vehicle, as to the floor board (not shown) thereof, the switch being operatively connected to the brake pedal 96, by means of a spring 98, or the like, so that the switch will be closed each time the brake pedal is depressed. This switch is electrically connected in series with the conductors 100 and 102, which conductors are respectively connected to the source of power 80, and to one terminal of the lamp 48 in the "Stop" chamber 44. Thus, each time the brake pedal 96 is depressed, the lamp in the "Stop" chamber 44 will be illuminated independently of whether the lamps in the "Left" or "Right" chambers are or are not illuminated.

Alternatively, the casing 28 and the indicating panes 56 may be molded integrally, the indicia numerals being stamped or formed in the material of the forward and rear portions of the casing. The casing and mounting bracket, exclusive of the forward and rear portions of the casing, which constitute the indicating panes, are sprayed with an opaque paint the color of the vehicle. Obviously, the indicating panes may be formed of a multi-colored plastic, as previously described, or they may alternatively be clear, the lamps 48 being suitably colored, or a suitably colored transparent membrane may be secured to the inner faces of the indicating panes in order that the respective chambers will emit the correct color when their lamp is illuminated.

It is thus thought readily apparent that there has been provided a signal director which is so constructed and mounted that a single unit is readily visible by both the approaching and the following motorists, in which the left and right signal directions may be selectively controlled by a single switch, and in which the stop light is controlled automatically upon the application of the brake.

From the foregoing, it is thought that the operation and construction of the device will be readily understood, and further discussion is therefore believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claims.

Having described the invention, what is claimed as new is:

1. A signal director comprising a support arm having a horizontally extending platform thereon, an upwardly extending hollow casing detachably secured to said platform, a vertically extending divider wall mounted on said platform and extending into said casing to provide a first and second compartment, a plurality of horizontally extending vertically spaced partition walls attached to said divider wall and extending into said first compartment to form a plurality of chambers therein, translucent panes in the forward and rear walls of said casing, illuminating means in each of said chambers, and conductors electrically connected to said illuminating means and extending into said second compartment.

2. A signal director comprising a support arm having a horizontally extending platform thereon, an upwardly extending hollow casing detachably secured to said platform, a vertically extending divider wall mounted on said platform and extending into said casing to provide a first and second compartment, a plurality of horizontally extending vertically spaced partition walls attached to said divider wall and extending into said first compartment to form a plurality of chambers therein, translucent panes in the forward and rear walls of said casing, a plurality of illuminating lamps mounted on said divider wall each extending into one of said chambers, and conductors electrically connected to said lamps and extending into said second compartment.

3. A signal director comprising a support arm having a horizontally extending platform thereon, an upwardly extending hollow casing detachably secured to said platform, a vertically extending divider wall mounted on said platform and extending into said casing to provide a first and second compartment, a plurality of horizontally extending vertically spaced partition walls attached to said divider wall and extending into said first compartment to form a plurality of chambers therein, translucent panes in the forward and rear walls of said casing, said divider wall having a plurality of bores therein communicating said second compartment with each of said chambers, lamps mounted in each of said bores and extending into said chambers, conductor means electrically connected to each of said lamps and extending into said second compartment.

4. The combination of claim 3 wherein said platform has a recess therein in the upper surface thereof, said divider wall being detachably received in said recess.

5. The combination of claim 1 wherein each of said panes has inwardly extending flanges thereon, a detent on the outer surface of one of said flanges, said divider wall having a recess therein complementary to said detent to detachably secure said panes thereto.

ARNOLD B. OGDEN.

REFERENCES CITED

The following references are of record in the file of this patent:

UNITED STATES PATENTS

| Number | Name | Date |
|---|---|---|
| 1,465,950 | Schiller | Aug. 28, 1923 |
| 1,501,198 | Brockman | July 15, 1924 |
| 1,579,037 | Smith | Mar. 30, 1926 |
| 2,015,917 | Bobroff | Oct. 1, 1935 |
| 2,176,546 | Robbins | Oct. 17, 1939 |